United States Patent
Honmatsu et al.

(10) Patent No.: US 9,643,560 B2
(45) Date of Patent: May 9, 2017

(54) TOUCH SENSOR AND AIRBAG COVER INTEGRATED INPUT DEVICE

(71) Applicant: POLYMATECH JAPAN CO., LTD., Saitama (JP)

(72) Inventors: Yoshifumi Honmatsu, Saitama (JP); Yasuyuki Abe, Saitama (JP)

(73) Assignee: POLYMATECH JAPAN CO., LTD., Saitama (JP)

( * ) Notice: Subject to any disclaimer, the term of this patent is extended or adjusted under 35 U.S.C. 154(b) by 0 days.

(21) Appl. No.: 14/912,969

(22) PCT Filed: Aug. 22, 2014

(86) PCT No.: PCT/JP2014/072042
§ 371 (c)(1),
(2) Date: Feb. 19, 2016

(87) PCT Pub. No.: WO2015/041001
PCT Pub. Date: Mar. 26, 2015

(65) Prior Publication Data
US 2016/0207489 A1     Jul. 21, 2016

(30) Foreign Application Priority Data

Sep. 19, 2013   (JP) ................................ 2013-194110

(51) Int. Cl.
    *B60R 21/203*       (2006.01)
    *B60R 21/215*       (2011.01)
               (Continued)

(52) U.S. Cl.
    CPC ........ *B60R 21/203* (2013.01); *B60R 11/0235* (2013.01); *B60R 21/215* (2013.01);
               (Continued)

(58) Field of Classification Search
CPC . B60R 21/203; B60R 21/215; B60R 21/2165; B60R 21/21658; B60R 11/0235; B60R 2011/001; B62D 1/046
See application file for complete search history.

(56) References Cited

U.S. PATENT DOCUMENTS

| | | | |
|---|---|---|---|
| 4,755,634 A | * 7/1988 | Pepper, Jr. | .............. G06F 3/045 |
| | | | 178/18.01 |
| 5,198,629 A | * 3/1993 | Hayashi | ................. B60Q 5/003 |
| | | | 200/512 |

(Continued)

FOREIGN PATENT DOCUMENTS

| | | |
|---|---|---|
| JP | 59-119487 A | 7/1984 |
| JP | 2-7159 U | 1/1990 |

(Continued)

OTHER PUBLICATIONS

International Search Report for PCT Patent App. No. PCT/JP2014/072042 (Sep. 30, 2014).

*Primary Examiner* — Laura Freedman
(74) *Attorney, Agent, or Firm* — Cermak Nakajima & McGowan LLP; Tomoko Nakajima

(57) ABSTRACT

A touch sensor usable in a portion which an airbag comes out of, such as the center portion of a steering wheel, and an airbag cover integrated input device including the touch sensor are provided. More specifically, a touch sensor attached to an airbag cover provided outside the airbag, and having end portions that form an insertion portion which the airbag passes through during the deployment of an airbag system is provided. Moreover, an airbag cover integrated input device in which the airbag cover has a thin wall portion that tears open during the deployment of the airbag system, and the end portions of the touch sensor are placed along the thin wall portion of the airbag cover is provided.

10 Claims, 3 Drawing Sheets

(51) Int. Cl.
  *B60R 21/2165* (2011.01)
  *B62D 1/04* (2006.01)
  *B60R 11/02* (2006.01)
  *B60R 11/00* (2006.01)
  *B60R 21/00* (2006.01)

(52) U.S. Cl.
  CPC .... *B60R 21/2165* (2013.01); *B60R 21/21658* (2013.01); *B62D 1/046* (2013.01); *B60R 2011/001* (2013.01); *B60R 2021/0004* (2013.01); *B60R 2021/0032* (2013.01); *B60R 2021/21506* (2013.01)

(56) References Cited

U.S. PATENT DOCUMENTS

| | | | | |
|---|---|---|---|---|
| 5,309,135 | A | * | 5/1994 | Langford ................ B60Q 5/00 280/728.3 |
| 5,423,569 | A | * | 6/1995 | Reighard .......... B60R 21/21658 200/61.54 |
| 5,449,197 | A | * | 9/1995 | Kerner .............. B60R 21/21658 280/728.3 |
| 5,465,998 | A | * | 11/1995 | Davis ...................... B60N 2/58 200/61.54 |
| 5,684,283 | A | * | 11/1997 | Hambleton, Jr. . B60R 21/21658 200/61.08 |
| 5,684,692 | A | | 11/1997 | Williams et al. |
| 5,721,409 | A | * | 2/1998 | Enders ............. B60R 21/21658 200/61.54 |
| 5,723,834 | A | * | 3/1998 | Hambleton, Jr. ...... B60Q 5/003 200/61.08 |
| 5,934,702 | A | * | 8/1999 | Coleman ................ B60Q 5/003 200/61.54 |
| 5,961,144 | A | * | 10/1999 | Desmarais ............. B60Q 5/003 280/731 |
| 5,964,477 | A | * | 10/1999 | Lehman ........... B60R 21/21658 200/61.54 |
| 8,474,860 | B2 | * | 7/2013 | Ohoka ................ B60R 11/0235 280/728.3 |
| 8,775,023 | B2 | * | 7/2014 | Frojdh ............. H04N 21/42201 701/36 |
| 9,007,190 | B2 | * | 4/2015 | Bosch ................... B60K 37/06 340/384.6 |
| 2005/0052426 | A1 | | 3/2005 | Hagermoster et al. |
| 2012/0074674 | A1 | | 3/2012 | Ohoka et al. |

FOREIGN PATENT DOCUMENTS

| | | | |
|---|---|---|---|
| JP | 06191415 A | * | 7/1994 |
| JP | 9-128133 A | | 5/1997 |
| JP | 2007-504983 A | | 3/2007 |
| JP | 2011-108269 A | | 6/2011 |
| JP | 2012-71687 A | | 4/2012 |
| WO | WO2005/025942 A2 | | 3/2005 |

* cited by examiner

TOUCH SENSOR AND AIRBAG COVER INTEGRATED INPUT DEVICE

This application is a national phase entry under 35 U.S.C. §371 of PCT Patent Application No. PCT/JP2014/072042, filed on Aug. 22, 2014, which claims priority under 35 U.S.C. §119 to Japanese Patent Application No. 2013-194110, filed September 19, 2013, both of which are incorporated by reference.

TECHNICAL FIELD

The present invention relates generally to a touch panel used as an interior component of a vehicle and, in particular to, a touch sensor provided together with the airbag cover of an airbag installed in the vehicle and an airbag cover integrated input device.

BACKGROUND ART

Airbag systems for protecting the passengers of a vehicle are installed in a steering wheel in the driver's seat, a passenger-side dashboard, and other places, and airbags are covered with and placed behind airbag covers. In the event of an impact such as a collision, the airbag systems deploy so that the airbag covers tear open and the airbags inflate to soften the impact on the passengers.

The airbag stored in the steering wheel in the driver's seat is large enough to cover the passenger when the airbag inflates. Thus, even when the airbag is stored in a folded state, it requires a certain storage space. That is, the airbag cover, which the airbag comes out of, also requires a relatively large area. Accordingly, in general, there is nothing except for an emblem or the like in the center portion of the steering wheel storing the airbag cover.

Meanwhile, steering switches such as buttons or input sensors with which input operation can be performed for on-board equipment may be placed on the steering wheel. For instance, Japanese Unexamined Patent Application Publication (Translation of PCT Application) No. 2007-504983 (Patent Literature 1) describes small touch sensors provided on the spokes of a steering wheel and an airbag cover.

CITATION LIST

Patent Literature

PTL 1: Japanese Unexamined Patent Application Publication (Translation of PCT Application) No. 2007-504983

SUMMARY OF INVENTION

Technical Problem

As described in Japanese Unexamined Patent Application Publication (Translation of PCT Application) No. 2007-504983 (Patent Literature 1), most touch sensors provided on steering wheels have small areas for input units. Thus, it is difficult to perform input operations for large screens. Drivers, however, operate various devices such as an audio device, an air conditioner, a mirror adjustment device, and a seat adjustment device, using switches. The number of operation switches increases and these operation units tend to become larger as vehicles have greater functionality and become more sophisticated. Accordingly, it has been more difficult to provide these operation switches in small areas such as the spokes of a steering wheel.

Meanwhile, the center portion of the steering wheel has a large area, and is a portion for a driver to easily perform operations. However, since an airbag comes out of the center portion, it is difficult to provide a touch sensor in the center portion.

In view of the above problems, the present invention aims to provide a touch sensor usable in a portion which an airbag comes out of, such as the center portion of a steering wheel, and an airbag cover integrated input device including the touch sensor.

Solution to Problem

To achieve the above objectives, the present invention provides a touch sensor attached to an airbag cover provided outside an airbag, and including a resin film in which an electrode portion and wires are formed, the touch sensor having end portions that form an insertion portion which the airbag passes through during the deployment of an airbag system.

The touch sensor, which is attached to the airbag cover provided outside the airbag, and includes the resin film in which the electrode portion and the wire are formed, has the end portions that form the insertion portion which the airbag passes through during the deployment of the airbag system. By passing through the insertion portion, the inflated airbag can easily come out without unnecessary resistance being applied to the airbag.

The insertion portion in the touch sensor may be formed as a slit. The provision of the slit in the touch sensor allows the airbag to come out through the slit. Thus, the provision of the touch sensor does not stop the airbag system from operating.

Moreover, the end portions of the touch sensor may be the overlapping portion of the resin film. Since the end portions of the resin film of the touch sensor are the overlapping portion, application of a pressing force to the end portions easily separates the end portions and forms the insertion portion, thereby allowing the airbag to come out. Accordingly, the provision of the touch sensor does not stop the airbag system from operating.

The present invention provides an airbag cover integrated input device including the touch sensor and the airbag cover. Since the touch sensor is provided together with the airbag cover, a touch input unit can be provided on the surface of the airbag cover storing the airbag.

The airbag cover integrated input device may further include a display placed above the touch sensor. For instance, the display may be provided on the surface of the airbag cover, and the touch sensor may be also provided on the surface of the airbag cover. Since the airbag cover integrated input device includes the display, the input device also functions as a display device. However, design ideas such as the provision of separate displays in portions above and below the tear portion of the airbag cover are necessary so that the display does not stop the airbag from coming out.

The airbag cover may have a thin wall portion that tears open during the deployment of the airbag system, and the end portions of the touch sensor may be placed along the thin wall portion.

The airbag cover has the thin wall portion, which tears open during the deployment of the airbag system, and the end portions of the touch sensor are placed along the thin wall portion. Thus, the easy-to-tear portion of the airbag cover is adjacent to the end portions or the insertion portion of the touch sensor. This allows the airbag to easily inflate and come out.

The airbag cover has a curved shape, and the touch sensor may have a shape that follows the curved shape. The shape of the touch sensor that follows the curved shape of the airbag cover allows the touch sensor to be in full contact with the airbag cover. Thus, the touch sensor has high sensitivity.

The touch sensor may be integrated into the airbag cover. The integration of the touch sensor and the airbag cover leads to a reduction in the number of components and effective use of space.

Such an airbag cover integrated input device may be provided in the center portion of a steering wheel. The provision of the airbag cover integrated input device in the center portion of the steering wheel allows a portion that has a large area and is relatively easily operated by a driver to serve as an input part or a display part. The input part or the display part can be provided so as not to stop the airbag from coming out.

Advantageous Effects of Invention

In the touch sensor or the airbag cover integrated input device in the present invention, the touch sensor can be placed on the surface of the airbag cover, behind which the airbag is stored, easily operated within reach of the driver, and does not stop the airbag from deploying.

Moreover, in the touch sensor and the airbag cover integrated input device in the present invention, the touch sensor can be provided in the center portion of the steering wheel having a curved shape. Thus, the shape of the touch sensor can be more freely designed.

DESCRIPTION OF EMBODIMENTS

The following describes further details of the present invention based on embodiments. Overlapping explanations of common elements in the following embodiments are omitted. Moreover, overlapping explanations of common materials, manufacturing methods, effects, and other common points are omitted.

Figure 1:
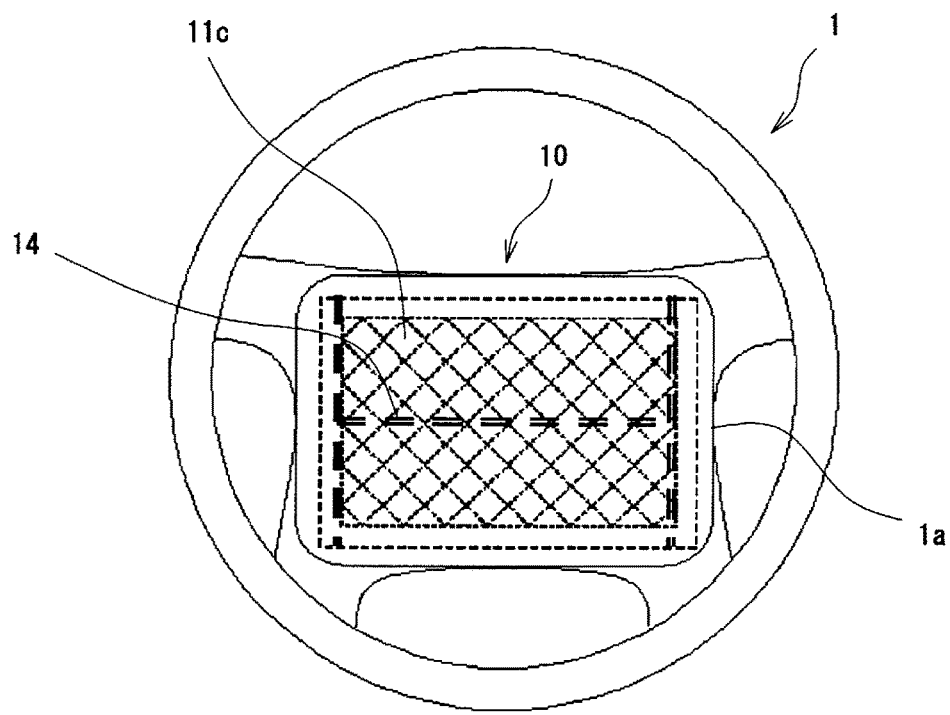
FIG. 1 is a schematic view of a steering wheel in which a touch sensor and an airbag cover integrated input device in EMBODIMENT 1 are provided.
Figure 2:
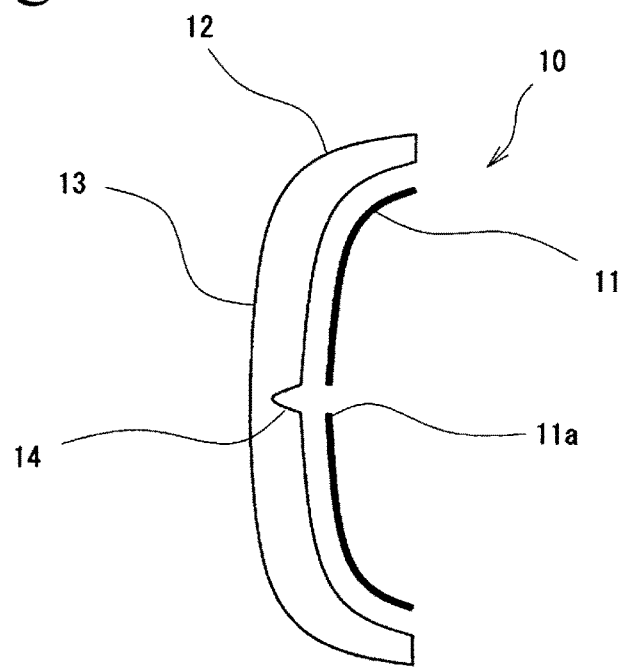
FIG. 2 is a schematic cross-sectional view of the center portion of the steering wheel in FIG. 1.

Embodiment 1 [FIGS. 1 to 4]:

The following describes an airbag cover integrated input device 10 in the present embodiment. FIG. 1 is a schematic view illustrating a steering wheel 1 to which the airbag cover integrated input device 10 is attached. FIG. 2 is a schematic cross-sectional view of the airbag cover integrated input device 10.

As FIG. 2 illustrates, the airbag cover integrated input device 10 includes an airbag cover 12 and a touch sensor 11 behind the airbag cover 12. A display unit 13 displaying switches or the like operated by a driver is provided on the front side of the airbag cover 12.

The airbag cover 12 is made of a synthetic resin or a thermoplastic elastomer, and is usually a surface material behind which an airbag (not illustrated) is stored. The airbag cover 12 is breakable so that the airbag inflates and comes out toward the driver during the deployment of an airbag system.

More specifically, a thin wall portion (tear portion) 14 that tears open during the deployment of the airbag system is formed in the airbag cover 12. The thin wall portion 14 is formed into a substantially H-shaped groove so that the airbag easily comes out upon the tearing of the thin wall portion 14.

In the present embodiment, the airbag is stored behind the steering wheel 1 as the driver-side airbag system, and the airbag cover 12 is provided in a center portion 1a of the steering wheel 1.

The display unit 13 on the surface of the airbag cover 12 displays switches or the like that are printed or formed with projections and depressions.

The touch sensor 11 is behind the airbag cover 12 and follows the shape of the airbag cover 12, and in contact with and integrated into the airbag cover 12. The touch sensor 11 has a slit 11a along the thin wall portion 14.

Figure 3:
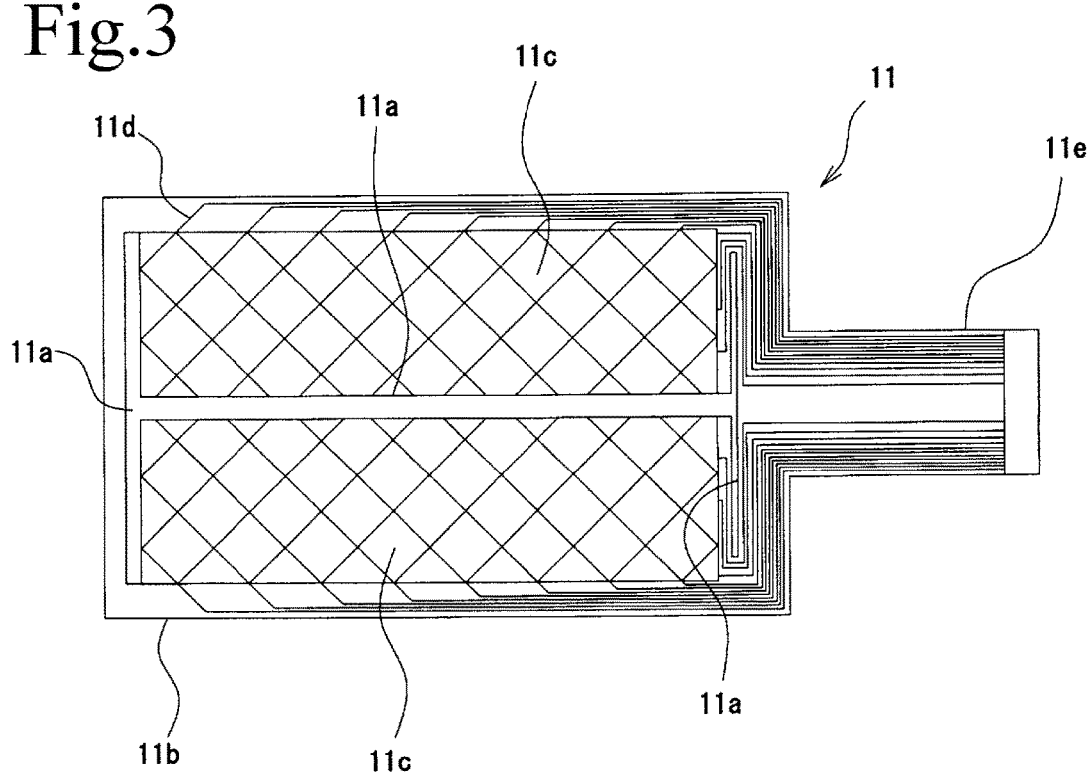
FIG. 3 is a plan view of the touch sensor.

As FIG. 3 illustrates, in the touch sensor 11, a capacitive sensor is placed in a resin film 11b that is a base material. Electrode portions 11c are made of copper foil or conductive polymers on the resin film 11b. Conductive wires 11d are connected to a terminal 11e in order to detect a change in capacitance when a finger approaches the touch sensor 11. The terminal 11e is connected to a circuit board or a detecting element, and detects a change in capacitance. However, the slit 11a, which is substantially H-shaped, is formed in the resin film 11b as the base material. Thus, the electrode portions 11c are provided on the opposite sides of the slit 11a in the center portion of the resin film 11b so as to avoid the slit 11a.

The airbag cover 12 and the touch sensor 11 are stuck to each other using double-sided tape or adhesive or by ultrasonic welding, heat welding, thermal caulking, or other methods. A wide surface that is almost the whole surface of the touch sensor 11, or a portion of the touch sensor 11 such as an end portion may be stuck to the airbag cover 12.

In the airbag cover integrated input device 10, the touch sensor 11 having the slit 11a is behind and integrated into the airbag cover 12. Thus, the touch sensor 11 having a large area can be provided except in the thin wall portion 14. Accordingly, various switch functions can be provided for the center portion 1a of the steering wheel 1, where the driver can easily perform operations.

Moreover, despite its relatively large area, the touch sensor 11 can be easily bent because of the slit 11a. Thus, the touch sensor 11 can follow and be stuck to the airbag cover 12 having a curved shape as a whole. Accordingly, the touch sensor 11 has high sensitivity.

Figure 4:
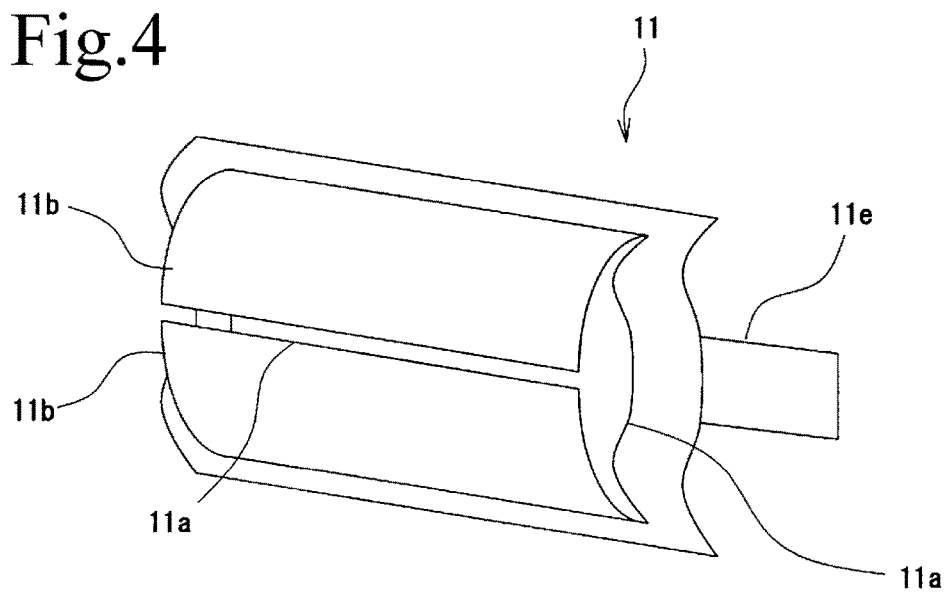
FIG. 4 is a perspective view of the touch sensor in FIG. 1 bending along the shape of an airbag cover.

The touch sensor 11 is provided in the center portion 1a of the steering wheel 1. This does not, however, stop the airbag cover 12 from tearing open during the deployment of the airbag system, thus allowing the airbag to inflate. FIG. 4 illustrates the touch sensor 11 bending along the shape of the airbag cover.

Various modifications can be made to the airbag cover integrated input device 10.

Rather than being substantially H-shaped, the slit 11a in the touch sensor 11 may be formed by segment lines that allow the base material 11b to be partially combined. It is preferable that the slit 11a have a breakable shape so that the airbag passes through the slit 11a when the airbag inflates.

It is preferable that the resin film 11b as the base material of the touch sensor 11 be formed so as to be curved in advance along the shape of the airbag cover 12. However, the resin film 11b may have a flat-plate shape. The resin film 11b can be bent along and stuck to the airbag cover 12 by providing various cuts or slits other than the slit 11a, which the airbag passes through.

Moreover, the touch sensor 11 and the display 13 may be provided on the front side of the airbag cover 12 instead of providing the touch sensor 11 behind the airbag cover 12.

Moreover, if the display and the screen of a car navigation system are provided in the center portion, a space above a top portion of a center console where the screen of the car navigation system has been placed can be used for other purposes.

Forming the airbag cover 12 or the touch sensor 11 to be partially light-transmissive allows the display unit 13 to display the positions of the electrode portions 11c of the touch sensor 11 by backlighting. Moreover, it is possible to cause a desired place to emit light by arranging LEDs or EL elements as backlight sources in the base material 11b of the touch sensor 11, or by using as a light guide the base material 11b of the touch sensor 11.

Since the center portion 1a of the steering wheel 1 includes a horn, it is preferable that an input to the touch sensor 11 be separately detected from an input to the horn. For instance, the following settings are possible. When a finger lightly touches the surface of the airbag cover 12, the touch sensor 11 detects the input with high sensitivity. Meanwhile, when a large amount of pressure is detected in the airbag cover 12, the horn detects the input but the touch sensor does not detect the input.

In addition to the driver-side airbag stored behind the steering wheel 1, examples of airbag systems include a passenger-side airbag, a side airbag, a curtain airbag, and a knee airbag. The touch sensors 11 and the airbag cover integrated input devices 10 can be used also in these airbag systems. The touch sensors 11 can be placed on the surfaces of the airbag covers storing these airbags so that the airbags are not stopped from inflating and coming out during the deployment of the airbags.

For instance, the airbag cover integrated input device 10 in which the touch sensor 11 is on a passenger-side dashboard may be provided.

Figure 5:
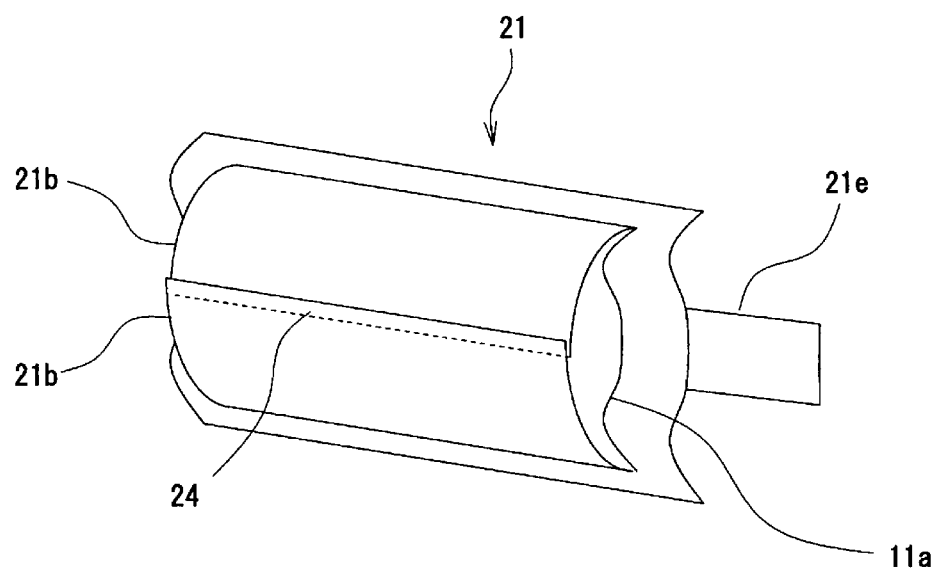
FIG. 5 is a perspective view of a touch sensor in another embodiment corresponding to FIG. 4.

Embodiment 2 [FIG. 5]:

FIG. 5 is a perspective view of a touch sensor 21 in the present embodiment. FIG. 5 illustrates the touch sensor 21 bending along the shape of an airbag cover. The touch sensor 21 is formed with a resin film 21b, and has an overlapping portion 24 where the resin film 21b overlaps. The overlapping portion 24 serves as an insertion portion which an airbag passes through during the inflation of the airbag. The present embodiment differs from the previous embodiment in that the overlapping portion 24 serves as the insertion portion instead of the slit 11aElectrode portions, wires, and a terminal 21e have shapes, sizes, or the like different from those of the electrode portions 11c, the wires 11d, and the terminal 11e, but have similar functions.

In the touch sensor 21, portions of the resin film 21b overlap with each other without a gap, thereby reducing the area where the electrode portions cannot be provided. A touch operation can be performed from one side of the overlapping portion 24 to the other side thereof.

Even in the touch sensor 21, application of a pressing force to the overlapping portion 24 easily opens the overlapping portion and creates a gap. This allows the airbag to pass through the gap. Thus, resistance to the discharge of the airbag can be suppressed to a low level.

The structural elements described in the embodiments can be modified and combined without departing from the scope of the present invention. Such modifications and combinations should be included in the technical ideas of the present invention.

REFERENCE SIGNS LIST steering wheel
1a center portion
10, 20 airbag cover integrated input device
11, 21 touch sensor
11a slit
11b, 21b resin film (base material)
11c, 21c electrode portion
11d, 21d wire
11e, 21e terminal
12 airbag cover
13 display unit
14 thin wall portion (tear portion)
24 overlapping portion (tear portion)

The invention claimed is:

1. A touch sensor attached to an airbag cover provided outside an airbag, comprising:
 a single resin film having a first portion and a second portion defined respectively by a cutout insertion portion formed in three directions by a cutout from the single resin film in a state before the airbag is inflated;
 an electrode portion and a wire formed and arranged on the resin film so as to avoid crossing the cutout insertion portion between the first portion and the second portion of the resin film, wherein the wire is made in two parts which are arranged respectively on the first portion and the second portion of the resin film so as to avoid crossing the cutout insertion portion and so as to avoid crossing a tear portion of the airbag cover which is configured to be arranged under the cutout insertion portion.

2. The touch sensor according to claim 1,
 wherein the insertion portion is a slit.

3. The touch sensor according to claim 1,
 wherein the resin film is partially overlapped at the insertion portion.

4. An airbag cover integrated input device including the touch sensor according to claim 1 and the airbag cover.

5. The airbag cover integrated input device according to claim 4,
 wherein the airbag cover has a thin wall portion that tears open during the deployment of the airbag system, and the insertion portion is placed along the thin wall portion.

6. The airbag cover integrated input device according to claim 4, wherein the airbag cover has a curved shape, and the touch sensor has a shape that follows the curved shape.

7. The airbag cover integrated input device according to claim 4, wherein the touch sensor and the airbag cover are integrated.

8. The airbag cover integrated input device according to claim 4, further including a display placed above the touch sensor.

9. The airbag cover integrated input device according to claim 4, provided in a center portion of a steering wheel.

10. The touch sensor according to claim 1, wherein the insertion portion is formed in a H-shape on the resin film.

* * * * *